Apr. 24, 1923.

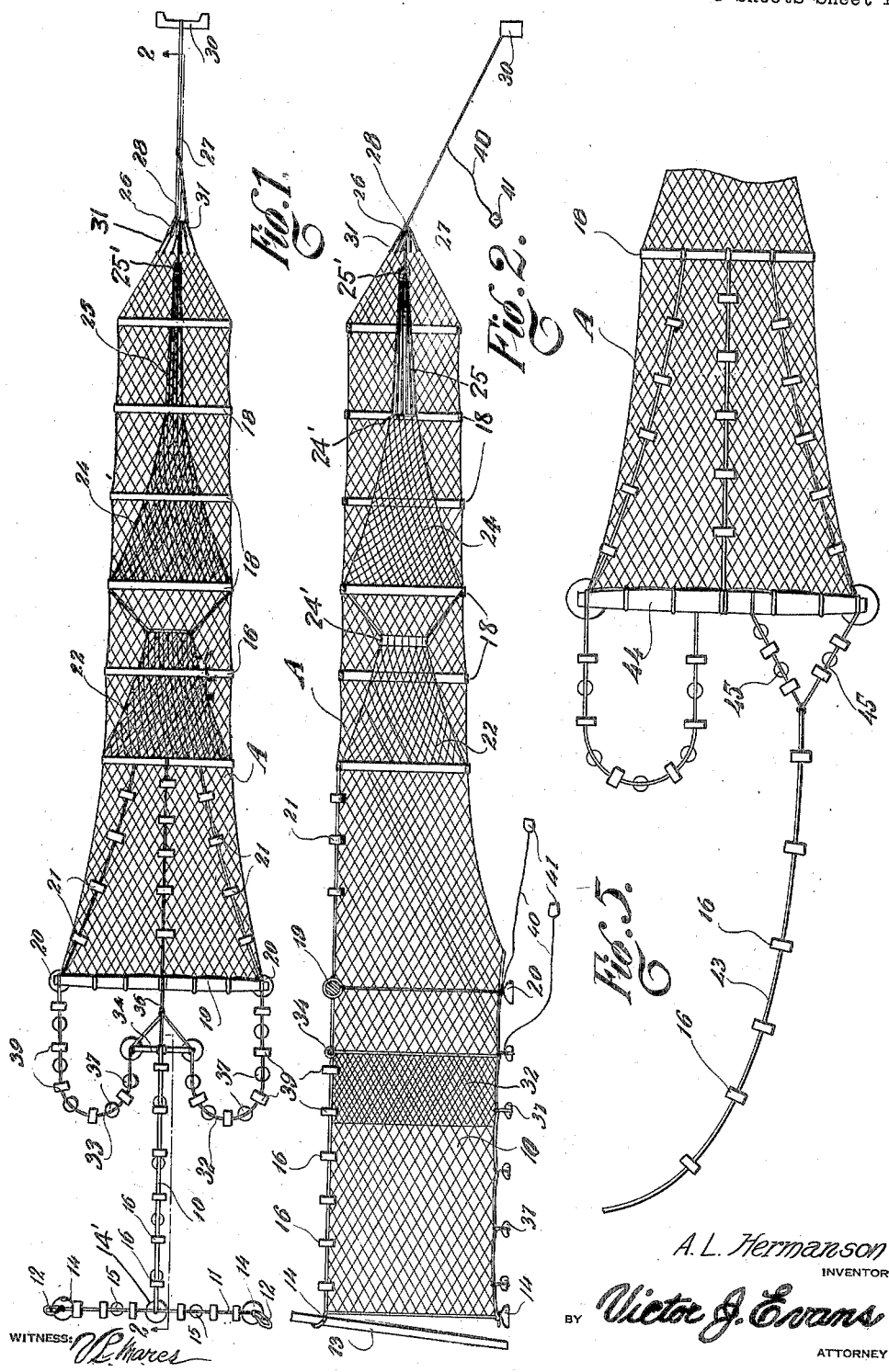

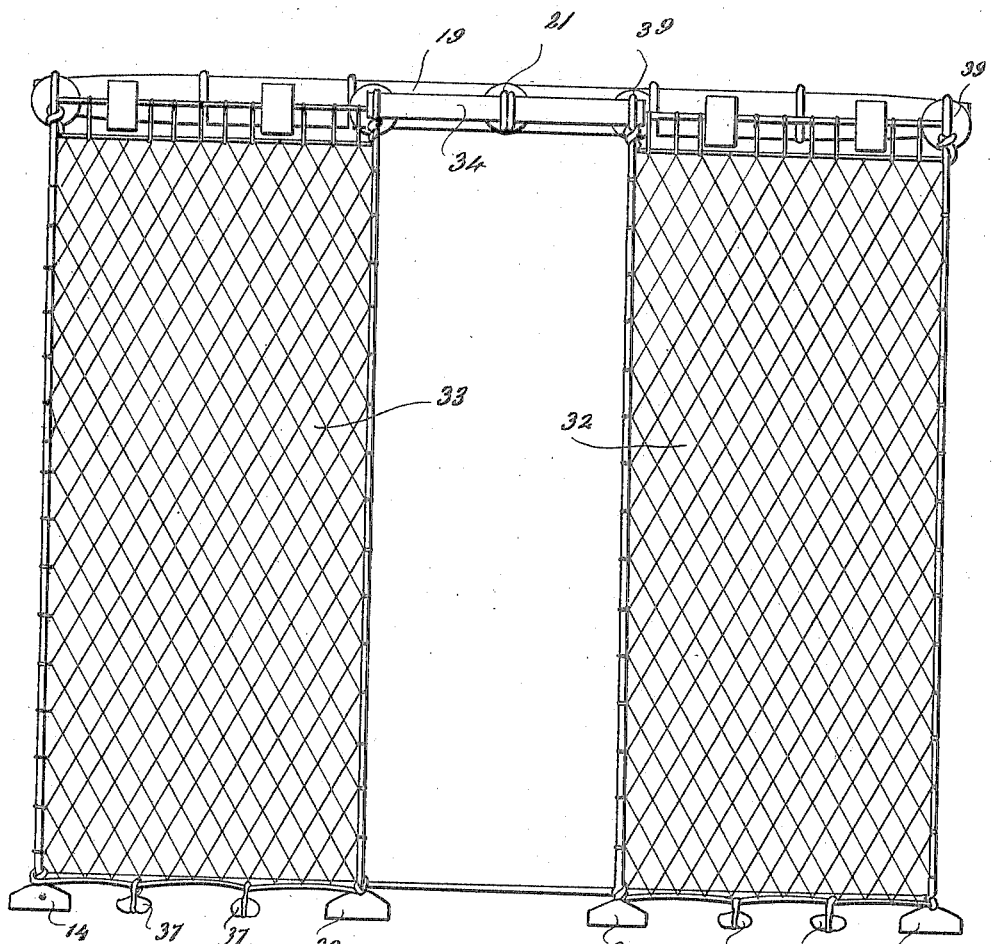

A. L. HERMANSON

FLOATING FISH TRAP

Filed July 23, 1920

Patented Apr. 24, 1923.

1,453,135

UNITED STATES PATENT OFFICE.

AUGUST L. HERMANSON, OF NOME, TERRITORY OF ALASKA.

FLOATING FISH TRAP.

Application filed July 23, 1920. Serial No. 398,356.

*To all whom it may concern:*

Be it known that I, AUGUST L. HERMANSON, a citizen of the United States, residing at Nome, in the precinct of Cape Nome and Territory of Alaska, have invented new and useful Improvements in Floating Fish Traps, of which the following is a specification.

This invention relates to a floating fish trap designed for catching different varieties of fish, and held extended in a position for use by means of anchors and weighted elements.

The nature and advantages of the invention will be readily apparent, when the following detailed description is taken in connection with the accompanying drawings, the invention residing in the construction, combination and arrangement of parts as claimed.

In the drawings forming part of this specification like numerals of reference indicate corresponding parts in the several views, and wherein:

Figure 1 is a top plan view of the trap constructed in accordance with my invention.

Figure 2 is a longitudinal sectional view taken on line 2—2 of Figure 1.

Figure 3 is an enlarged front end elevation showing the mouth of the trap.

Figure 5 is a fragmentary plan view of the modified form.

Figure 4:
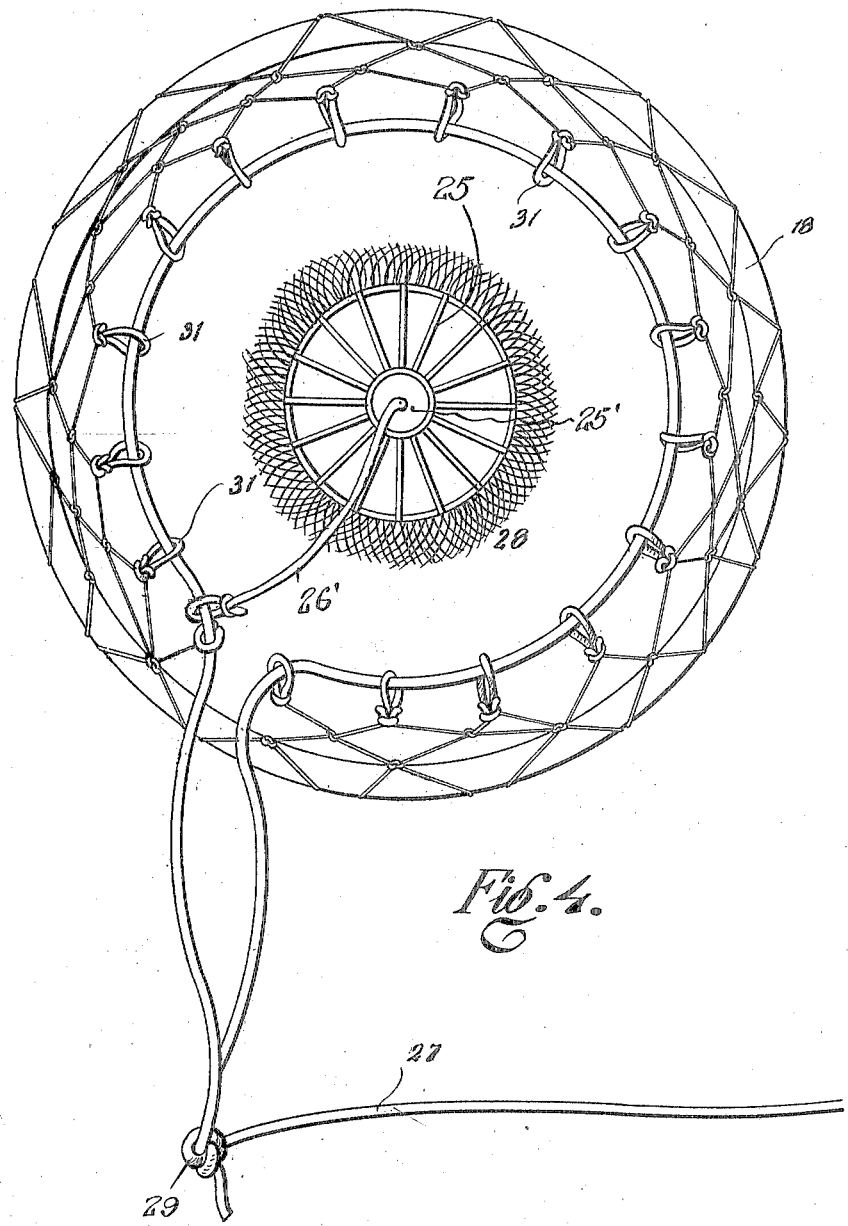
Figure 4 is a rear end elevation of the trap showing the latter opened for removal of the fish from the trapping compartment.

Referring to the drawings in detail, 10 indicates the lead of a netting or mesh of any suitable material which extends from the shore and connected with the trap proper in a manner to be hereinafter described. The lead 10 may be of any suitable dimension, and is provided at its end adjacent the shore with wings 11 constructed from the same material embodied in the construction of the lead 10. The wings 11 are provided with loops 12 at the upper and lower corners thereof, these loops when arranged in a line being adapted to receive a stake or other suitable element 13 for securing the lead to the shore as will be readily understood. The lower corners of the wings 11 are equipped with weighted elements 14, and similar elements 15 by securing along the lower edge of the lead at spaced intervals to hold the latter spread when the trap is in use. A plurality of elements 16 are secured along the upper edge of the lead 10 at spaced intervals, these elements being constructed of cork or other suitable material which will float on the water. The outermost lower corner of the lead 10 is also equipped with a weighted element 14' similar to elements 14 hereinabove mentioned.

The trap proper indicated at A includes a body of substantially cylindrical formation in cross section. This body is formed from the same material used in the production of the lead 10, and a plurality of spaced rings 18, in which the body of the trap is secured. The trap proper may be of any suitable dimension, and the rings 18 spaced apart any desired distance. The mouth of the trap is of substantially rectangular formation as clearly shown in Figure 3, the upper edge of the mouth being secured in any suitable manner by a boom 19. The lowermost corners of the mouth are equipped with weighted elements 20 to hold the mouth open when the trap is in use, while the top of the body of the trap immediately adjacent the mouth has secured thereto a plurality of float elements 21. These elements assist the weights 20 in holding the mouth open for entrance of the fish into the trap. Arranged within the trap body, is a substantially frusto-conical member 22 which is constructed also from netting and has its large end secured to one of the rings of the trap body, and its smaller end suspended from another of the rings so as to lie centrally of the body. Arranged immediately at the rear of the frusto-conical member 22, is a substantially cone shaped member also constructed from netting and having its large end secured to one of the rings as shown. The small end of each of the members 22 and 24 is provided with a ring indicated at 24. Extending from around the small end of this member are a plurality of spaced strands 25 between which the fish pass when entering the trap chamber; these strands having their outer extremities secured to a block 25'. This block is connected by a flexible element 26', which may have a loop at its outer end, to the anchoring line 27. This anchoring line extends from the opening 28 in the trap body and is provided at its outer end with an anchor or weight 30. At its inner end the anchor line is threaded thru a plurality of flexible loops 31 projecting from the edge of the opening, the line passing also thru the loop of the flexible element 26', and being tied at a suitable point within its length, as indicated at 29. It will thus be seen that when the anchor line is stretched taut for holding the trap stretched out from the shore, the loops 31 will be drawn together to close the opening and when the line is slackened the loops may be spread apart to expand the opening, whereby the fish may be readily removed from the trap.

Secured to each side of the open mouth of the trap body, is one vertical edge of a pair of guide loops 32 and 33 respectively, each of these loops being constructed from netting, in other words, the same material used in the construction of the trap body. The upper corresponding corners of these loops are secured to the adjacent terminals of a connecting rod 34 which rod, provides a common connection between said loops and the lead 10 with the trap body. The bar 34 is connected to the boom as at 36. When the trap is in use, the loops 33 and 34 are arranged vertically as shown in Figures 1 and 2. Each loop has secured to its lower edge a plurality of weighted elements 37 which hold the loop extended or spread in position for use. The upper edge of each loop is provided with a plurality of floating elements 39. Connected to the lowermost corner of the open mouth of the trap body, and also connected to the anchoring loop 27 are flexible elements 40 each of which is terminally provided with a float 41.

In practice, the trap is arranged to float in the water, the lead 10 being secured to the shore as above described. The lead 10 serves to direct the fish that come in contact with the lead toward the trap body A, passing between the free vertical edges of the loops 33 and 34. Should the fish reverse their direction and prevent their passing beyond the lead 10, they abut one or the other of the loops 32 or 33 and are again directed into the mouth of the trap body A. Continuing their journey into the trap body, they pass through the frustro-conical member 22 and hence through the substantially cone shaped member 24 through the open end of the latter and between the strands 25 into the trapping compartment defined by the space between the cone shaped member 24 and the trap body proper. When it is desired to remove the fish from the trap, it is only necessary to slacken the anchor rope 27, so that the opening 28 at the end of the trap body can be enlarged or distended for the removal of the fish therethrough. When the anchor rope 27 is released, the weight of the anchor draws the opening 28 of the trap body closed.

In Figure 5 I have illustrated a modified form of the invention, wherein one of the loops indicated at 32 is eliminated when fishing from one side only of the trap. In this form of the invention, the lead 43 is directly connected to the boom 44 by means of the wings 45 forming part of the lead as shown. Otherwise the invention is the same as hereinabove described in connection with the preferred form of the invention.

While it is believed that from the foregoing description, the nature and advantages of the invention will be readily apparent, I desire to have it understood that I do not limit myself to the details herein shown and described, and that such changes may be made when desired as fall within the scope of the appended claims.

Having described the invention what is claimed is:—

1. A floating fish trap comprising a trap body of substantially cylindrical formation, a lead connected with the trap body, weighted members suspended from the lower edge of the said lead and the adjacent end of the trap body, the opposite end of the said body having an opening susceptible of expansion and contraction, entrance fuels arranged within the trap body, an anchoring cord, and an anchor carried by the cord, said anchoring cord being associated with the latter mentioned opening in the trap body to normally hold said opening contracted.

2. A floating fish trap comprising a trap body of cylindrical formation, a lead connected with the trap body, a plurality of spaced entrance funnels arranged within the trap body, weighted members suspended from the lower edge of the lead and the adjacent end of the trap body, the opposite end of the trap body having an outlet opening susceptible of contraction and expansion, an anchoring cord, an anchor carried by the cord, said cord being threaded through loops associated with the latter mentioned opening and normally holding the latter contracted, flexible strands leading from the small open end of the innermost conical member, said strands having their corresponding ends connected by a loop with the anchoring cord as and for the purpose specified.

3. A floating fish trap comprising an elongated trap body of cylindrical formation terminating at one end in a substantially rectangular funnel and at the opposite end in a series of flexible loops, a plurality of successively arranged entrance funnels within the trap body, anchoring means at opposite lower corners of the rectangular funnel, stretching lines including floats connected with the said anchored corners of the rectangular funnel for stretching the lead line thereof, a shore lead connected with the said rectangular funnel and having anchoring means, and an anchoring line having one end threaded thru the loops at the opposite end of the strap to provide a draw-string and the other end carrying a weight, said anchoring line serving to close the end of the trap when in anchoring position.

In testimony whereof I affix my signature.

AUGUST L. HERMANSON.